United States Patent
Alexander et al.

(10) Patent No.: US 9,038,379 B2
(45) Date of Patent: May 26, 2015

(54) METHOD OF CONTROLLING A THERMAL ENERGY HARVESTING SYSTEM

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Nilesh D. Mankame, Ann Arbor, MI (US); Xiujie Gao, Troy, MI (US); Geoffrey P. McKnight, Los Angeles, CA (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 739 days.

(21) Appl. No.: 12/908,191

(22) Filed: Oct. 20, 2010

(65) Prior Publication Data
US 2011/0120111 A1    May 26, 2011

Related U.S. Application Data

(60) Provisional application No. 61/263,177, filed on Nov. 20, 2009.

(51) Int. Cl.
*F01B 29/10* (2006.01)
*F03G 7/06* (2006.01)

(52) U.S. Cl.
CPC .............. *F01B 29/10* (2013.01); *F03G 7/065* (2013.01)

(58) Field of Classification Search
CPC ............ F03G 7/065; F03G 7/06; F03G 7/00; Y02T 10/166; F02G 5/00–5/04; F01B 29/10
USPC ........................................... 60/516, 527–529
See application file for complete search history.

(56) References Cited

U.S. PATENT DOCUMENTS

| | | | | |
|---|---|---|---|---|
| 4,055,955 A | * | 11/1977 | Johnson | 60/527 |
| 4,553,393 A | * | 11/1985 | Ruoff | 60/528 |
| 4,716,731 A | * | 1/1988 | Sakai et al. | 60/527 |
| 4,977,886 A | * | 12/1990 | Takehana et al. | 600/151 |
| 5,410,998 A | * | 5/1995 | Paul et al. | 123/204 |
| 7,256,518 B2 | * | 8/2007 | Gummin et al. | 310/12.33 |
| 2006/0272328 A1 | * | 12/2006 | Hara et al. | 60/527 |
| 2007/0175213 A1 | * | 8/2007 | Featherstone et al. | 60/527 |

(Continued)

FOREIGN PATENT DOCUMENTS

JP    2009203876 A    9/2009

*Primary Examiner* — Thomas Denion
*Assistant Examiner* — Mickey France
(74) *Attorney, Agent, or Firm* — Quinn Law Group, PLLC

(57) ABSTRACT

A method of controlling an energy harvesting system that converts excess thermal energy into mechanical energy and includes a Shape Memory Alloy (SMA) member, includes obtaining current operational parameters of the energy harvesting system, such as a maximum temperature, a minimum temperature and a cycle frequency of the SMA member. The current operational parameters are compared to a target operating condition of the energy harvesting system to determine if the current operational parameters are within a pre-defined range of the target operating condition. If the current operational parameters are not within the pre-defined range of the target operating condition, then a heat transfer rate to, a heat transfer rate from or a cycle frequency of the SMA member is adjusted to maintain operation of the energy harvesting system within the pre-defined range of the target operating condition to maximize efficiency of the energy harvesting system.

14 Claims, 4 Drawing Sheets

(56) References Cited

U.S. PATENT DOCUMENTS

| | | | |
|---|---|---|---|
| 2011/0139395 A1* | 6/2011 | Browne et al. | 165/41 |
| 2011/0139396 A1* | 6/2011 | Browne et al. | 165/41 |
| 2011/0165981 A1* | 7/2011 | Alexander et al. | 474/202 |
| 2011/0179790 A1* | 7/2011 | Pretorius | 60/641.15 |

* cited by examiner

METHOD OF CONTROLLING A THERMAL ENERGY HARVESTING SYSTEM

CROSS-REFERENCE TO RELATED APPLICATIONS

This application claims the benefit of U.S. Provisional Patent Application Ser. No. 61/263,177, filed on Nov. 20, 2009, the disclosure of which is hereby incorporated by reference.

TECHNICAL FIELD

The present invention generally relates to a vehicle, and more specifically, to a thermal energy harvesting system for the vehicle and vehicle accessories, and a method of controlling the energy harvesting system.

BACKGROUND OF THE INVENTION

Vehicles are traditionally powered by an engine, which powers the vehicle and provides the power to charge a battery of the vehicle. The battery provides power for starting the engine and for operating various vehicle accessories. During operation, the engine produces a large quantity of excess heat, i.e., excess thermal energy that is typically dissipated into the atmosphere and lost.

Advancements in technology and desire for driver conveniences have increased the number of vehicle accessories, as well as increased the load, i.e., power demand, on the engine and/or the battery required to power the vehicle accessories. Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if the vehicle's waste heat is converted into usable mechanical and/or electrical energy.

SUMMARY OF THE INVENTION

A method of controlling an energy harvesting system that converts excess thermal energy from a heat source into mechanical energy is disclosed. The method includes obtaining current operational parameters of the energy harvesting system. The method further includes comparing the obtained current operational parameters to a target operating condition of the energy harvesting system to determine if the current operational parameters are within a pre-defined range of the target operating condition of the energy harvesting system. The method further includes adjusting the operation of the energy harvesting system when the current operational parameters are outside the pre-defined range of the target operating condition until the obtained current operational parameters are within the pre-defined range of the target operating conditions to maximize an operating efficiency of the energy harvesting system.

Accordingly, the disclosed method maximizes the efficiency of the energy harvesting system by adjusting the operation of the energy harvesting system to within the target operating condition. By maintaining the operation of the energy harvesting system within the target operating condition, the method of controlling the energy harvesting system ensures that the excess thermal energy is not wasted, and that the energy harvesting system converts as much of the excess thermal energy as possible into mechanical energy.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
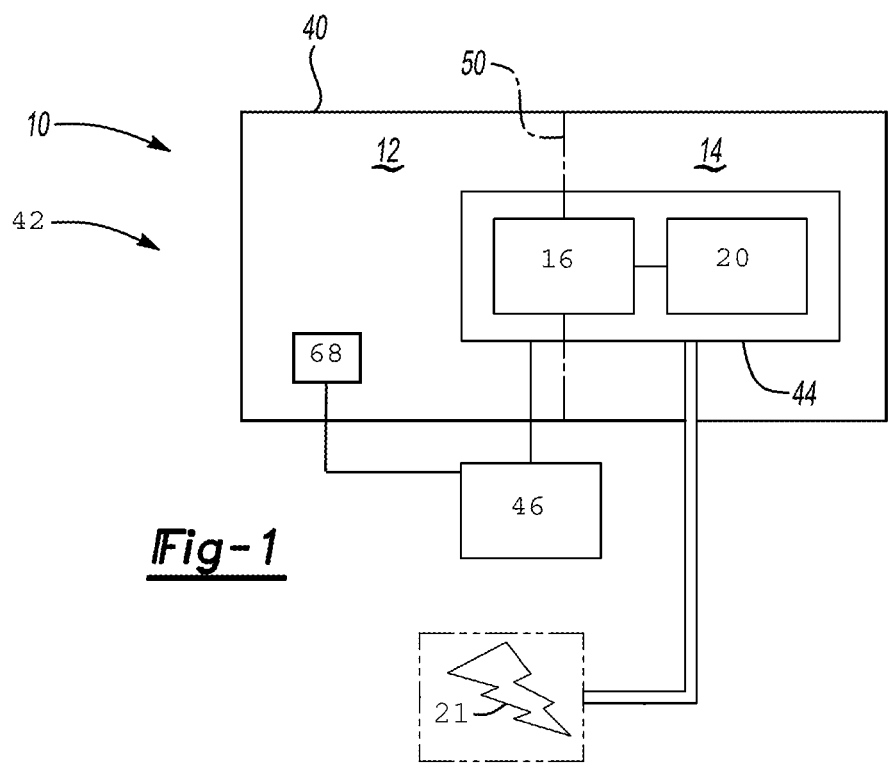
FIG. 1 is a schematic diagram of a vehicle having an energy harvesting system.

Referring to the Figures, wherein like reference numerals refer to like elements, a vehicle is shown generally at 10 in FIG. 1. Referring to FIG. 1, the vehicle 10 includes an energy harvesting system 42. The energy harvesting system 42 utilizes the temperature difference between a first fluid region 12 and a second fluid region 14 to generate mechanical or electrical energy, and therefore may be useful for automotive applications. However, it is to be appreciated that the energy harvesting system 42 may also be useful for non-automotive applications such as, but not limited to, household and industrial heating applications and geothermal heat sources.

The vehicle 10 defines a compartment 40 which may house power and drive sources for the vehicle 10, such as an engine and transmission (not shown). The compartment 40 may or may not be enclosed from the surrounding environment, although it is likely separated from a passenger compartment (not shown). Examples of the areas within a vehicle where the compartment may be located include, but are not limited to, a proximity to an exhaust system, a proximity to a battery for the vehicle or within a battery compartment for an electric vehicle, a proximity to a transmission, a proximity to brakes, or within a proximity to components of the vehicle suspension in particular a shock absorber, or within a proximity to or incorporated within a heat exchanger, such as a radiator. The above examples list areas of the vehicle 10 which may act as one of the first fluid region 12 or the second fluid region 14. The energy harvesting system 42 may be positioned such that the other of the first fluid region 12 or the second fluid region 14 is located remotely or separated by a barrier 50 to provide the required temperature differential. The above list is only of examples of where the energy harvesting system 42 may be located and is not intended to be all inclusive of arrangements for the energy harvesting system 42. One skilled in the art would be able to determine areas having an associated temperature differential and an appropriate position for the energy harvesting system 42 to take advantage of the temperature differences.

The energy harvesting system 42 is at least partially located within the compartment 40. The power and drive sources (not shown) for the vehicle 10 typically generate heat. Therefore, the compartment 40 includes the first fluid region 12 and the second fluid region 14 having a temperature difference therebetween. The first fluid region 12 and the second fluid region 14 may be spaced apart from one another, or a barrier 50, such as a heat shield, may be employed to separate the compartment 40 into the first fluid region 12 and the second fluid region 14. The fluid within the energy harvesting system 42 forming the first fluid region 12 and the second fluid region 14 may be selected from a group of gases, liquids, and combinations thereof. In the embodiment discussed above where the compartment 40 is an engine compartment, fluid within the first fluid region 12 and the second fluid region 14 is gas within the compartment 40.

Figure 2:
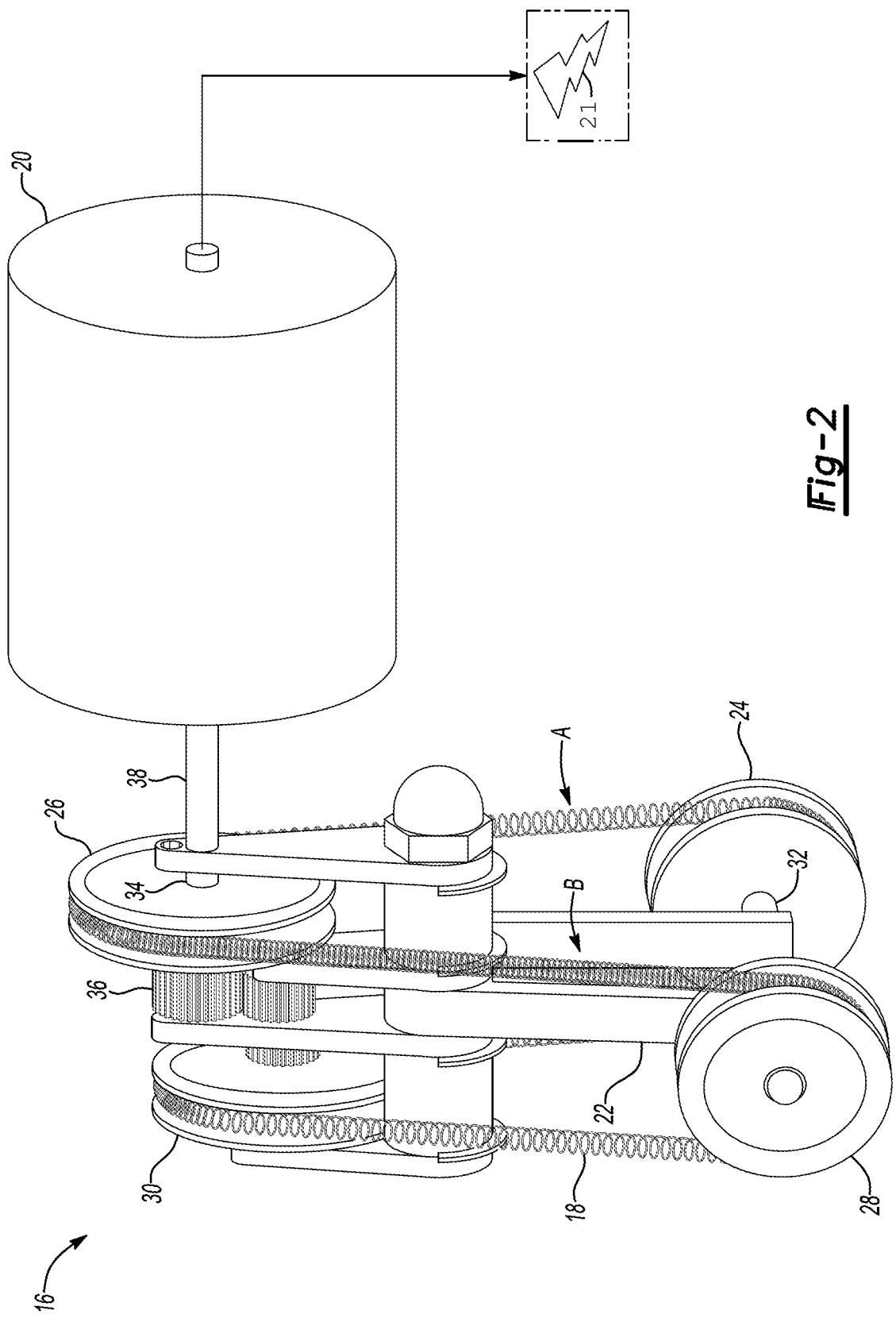
FIG. 2 is a perspective view of an embodiment of the energy harvesting system of FIG. 1.

Referring also to FIG. 2, the energy harvesting system 42 includes a heat engine 16. The heat engine 16 is configured for converting thermal energy, e.g., heat, to mechanical or heat to first mechanical and then to electrical energy, as set forth in more detail below. More specifically, the heat engine 16 includes a shape memory alloy 18 (FIG. 2) having a crystallographic phase changeable between austenite and martensite in response to the temperature difference of the first fluid region 12 and the second fluid region 14 (FIG. 1).

As used herein, the terminology "shape memory alloy" refers to alloys which exhibit a shape-memory effect. That is, the shape memory alloy 18 may undergo a solid state phase change via molecular or crystalline rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first fluid region 12 and the second fluid region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pre-strained pseudoplastically so as to convert thermal energy to mechanical energy. More specifically, the shape memory alloy 18 may dimensionally contract if the shape memory alloy 18 has been previously pre-strained pseudoplastically by the application of the strain. Conversely, the shape memory alloy 18 may change crystallographic phase from austenite to martensite and if under stress thereby dimensionally expand. That is, the shape memory alloy 18 may dimensionally contract under stress to convert thermal energy to mechanical energy, and then stretch back during the martensite phase to repeat the cycle.

The term "pre-strained pseudoplastically" refers to stretching the shape memory alloy 18 while in the martensite phase so that the strain exhibited by the shape memory alloy 18 under that loading condition is not fully recovered when unloaded, where purely elastic strain would be fully recovered. For a non-shape memory material, the non-recovered portion of that strain would be due to plastic deformation, which would be permanent for that material. In the case of the shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load being applied.

The shape memory alloy 18 may have any suitable composition. In particular, the shape memory alloy 18 may include an element selected from the group of cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Further, the shape memory alloy 18 may have any suitable form, i.e., shape. For example, the shape memory alloy 18 may have a form selected from the group of bias members, tapes, wires, bands, continuous loops, and combinations thereof. Referring to FIG. 2, in one variation, the shape memory alloy 18 may be formed as a continuous loop spring.

The shape memory alloy 18 may convert thermal energy to mechanical energy via any suitable manner. For example, the shape memory alloy 18 may activate a pulley system (shown generally in FIG. 2 and set forth in more detail below), engage a lever (not shown), rotate a flywheel (not shown), engage a screw (not shown), and the like.

The energy harvesting system 42 also includes a driven component 20. The component 20 may be a simple mechanical device, such as a fan, which is driven by the heat engine 16. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16 may also allow an associated existing system within the vehicle 10 to be decreased in size/capacity. In the example above, the heat engine 16 may assist in driving a fan for the heating/cooling system allowing the main heating cooling system capacity to be decreased and providing weight savings in addition to the energy savings.

Alternately, the component 20 may be a generator. The component/generator 20 is configured for converting mechanical energy from the heat engine 16 to electricity (represented generally by reference numeral 21 in FIGS. 1 and 2). The component/generator 20 may be any suitable device for converting mechanical energy to electricity 21. For example, the component/generator 20 may be an electrical generator that converts mechanical energy to electricity 21 using electromagnetic induction, and may include a rotor (not shown) that rotates with respect to a stator (not shown). The electrical energy from the component/generator 20 may then be used to assist in powering the main or accessory drive systems within the vehicle 10, or stored in a battery, hydraulic accumulator, pneumatic accumulator, flywheel or other energy storage device.

As shown in FIG. 2, the component 20 is driven by the heat engine 16. That is, mechanical energy resulting from the conversion of thermal energy by the shape memory alloy 18 may drive the component 20. In particular, the aforementioned dimensional contraction and the dimensional expansion of the shape memory alloy 18 coupled with the changes in modulus accompanying the dimensional changes may drive the component 20.

More specifically, in one variation shown in FIG. 2, the heat engine 16 may include a frame 22 configured for supporting one or more wheels 24, 26, 28, 30 disposed on a plurality of axles 32, 34. The wheels 24, 26, 28, 30 may rotate with respect to the frame 22, and the shape memory alloy 18 may be supported by, and travel along, the wheels 24, 26, 28, 30. Speed of rotation of the wheels 24, 26, 28, 30 may optionally be modified by one or more gear sets 36. Moreover, the component 20 may include a drive shaft 38 attached to the wheel 26. As the wheels 24, 26, 28, 30 turn about the axles 32, 34 of the heat engine 16 in response to the dimensionally expanding and contracting shape memory alloy 18 and the changes in modulus accompanying the dimensional changes, a drive shaft 38 rotates and drives the component 20.

Referring again to FIG. 1, the energy harvesting system 42 is configured for generating mechanical or electric energy. More specifically, the energy harvesting system 42 includes the first fluid region 12 having a first temperature and the second fluid region 14 having a second temperature that is different from the first temperature. For example, the first temperature may be higher than the second temperature. The temperature difference between the first temperature and the second temperature may be as little as about 5° C. or as large as more than 100° C. Stated differently, the temperature difference between the first temperature and the second temperature may be greater than or equal to about 5° C. and less than or equal to about 500° C., and more precisely less than or equal to about 30° C.

The heat engine 16, and more specifically, the shape memory alloy 18 (FIG. 2) of the heat engine 16, is disposed in contact with each of the first fluid region 12 and the second fluid region 14. Therefore, the shape memory alloy 18 may change crystallographic phase between austenite and martensite upon thermal exposure to one of the first fluid region 12 and the second fluid region 14. For example, upon thermal exposure with the first fluid region 12, the shape memory alloy 18 may change from martensite to austenite. Likewise, upon thermal exposure with the second fluid region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pre-pseudoplastically strained, may dimensionally contract upon changing crystallographic phase from martensite to austenite to thereby convert thermal energy to mechanical energy, and may dimensionally expand, if under tensile stress, upon changing crystallographic phase from austenite to martensite to repeat the cycle. Therefore, for any condition wherein the temperature difference exists between the first temperature of the first fluid region 12 and the second temperature of the second fluid region 14, i.e., wherein the first fluid region 12 and the second fluid region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to rotate the wheels 24, 26, 28, 30 (shown in FIG. 2) and, thus, drive the component 20.

In operation, with reference to the heat harvesting system 42 of FIG. 1 and described with respect to the example configuration of the shape memory alloy 18 shown in FIG. 2, one wheel 28 may be immersed in the first fluid region 12 while another wheel 24 may be immersed in the second fluid region 14. As one area (generally indicated by arrow A) of the shape memory alloy 18 dimensionally expands, i.e., dimensionally stretches, when under stress and in contact with the second fluid region 14, another area (generally indicated by arrow B) of the shape memory alloy 18 that is pseudoplastically strained in contact with the first fluid region 12 dimensionally contracts. Alternating dimensional contraction and expansion of the continuous spring loop form of the shape memory alloy 18 upon exposure to the temperature difference between the first fluid region 12 and the second fluid region 14 can cause the shape memory alloy 18 to convert potential mechanical energy to kinetic mechanical energy, thereby driving the wheels 24, 26, 28, 30 and converting thermal energy to mechanical energy. Therefore, for optimal efficiency of the energy harvesting system 42, the first fluid region 12 and the second fluid region 14 are preferably refreshed to maintain the temperature differential therebetween.

The heat engine 16 and the component/generator 20 may be disposed within the compartment 40 of the vehicle 10. In particular, the heat engine 16 and component 20 may be disposed in any location within and without the vehicle 10 as long as the shape memory alloy 18 is disposed in contact with each of the first fluid region 12 and the second fluid region 14. Further, the heat engine 16 and the component 20 may be surrounded by a vented housing 44 (FIG. 1). The housing 44 may define cavities (not shown) through which electronic components, such as wires may pass. A barrier 50 may be located within the housing 44 to separate the first fluid region 12 from the second fluid region 14.

Referring now to FIG. 1, in one variation, the energy harvesting system 42 also includes an electronic control unit 46. The electronic control unit 46 is in operable communication with the vehicle 10. The electronic control unit 46 may be, for example, a computer that electronically communicates with one or more controls and/or sensors of the energy harvesting system 42. The electronic control unit 46 may communicate with one or more sensors of the energy harvesting system 42. For example, the electronic control unit 46 may communicate with and/or control one or more of a temperature sensor within the first fluid region 12, a temperature sensor within the second fluid region 14, a speed regulator of the component 20, displacement sensors, force sensors, torque sensors, stress sensors, strain sensors, fluid flow sensors, a cycle sensor and meters configured for monitoring electricity generation. The electronic control unit 46 further includes and controls at least one actuator 58 configured for controlling the operation of the energy harvesting system 42. The actuator(s) 58 may include valves, linear and/or rotary actuators, clutches, brakes, disconnects, means for changing a heat transfer rate to and/or from the shape memory alloy member 18, e.g., and adjustable heat transfer medium, or any other device capable of controlling the operation of the energy harvesting system 42.

The electronic control unit 46 may control the harvesting of energy under predetermined conditions of the vehicle 10. For example, after the vehicle 10 has operated for a sufficient period of time to ensure that a temperature differential between the first fluid region 12 and the second fluid region 14 is at an optimal difference. An electronic control unit 46 may also provide the option to manually override the heat engine 16 to allow the energy harvesting system 42 to be turned off. A clutch (not shown) controlled by the electronic control unit 46 may be used to disengage the heat engine 16 from the component 20.

Many factors affect the operation and/or performance of the energy harvesting system 42. These factors may include, but are not limited to, the waste heat available from a heat source 62, which varies significantly over the operating cycle as a function of load; the heat transfer rate to the shape memory alloy member 18 for conversion into mechanical power; the rate at which heat is rejected from the shape memory alloy member 18 to complete the cooling part of the cycle, and the load on the heat engine 16 of the energy harvesting system 42. These factors vary with time. Accordingly, appropriate real time control of the energy harvesting system 42 is required. To maximize the power output from the heat engine 16, both the work output per transformation cycle and a cycle frequency must be maximized. In order to maximize the work output per transformation cycle of the heat engine 16, the shape memory alloy member 18 must be controlled to undergo complete transformation between the martensite phase and the austenite phase. In order to maximize the cycle frequency of the heat engine 16, the heating and the cooling of the shape memory alloy member 18 must be controlled to avoid overheating and/or overcooling to minimize both cycle duration and heat energy waste. Accordingly, a method of controlling the energy harvesting system 42 is disclosed herein.

Figure 3:
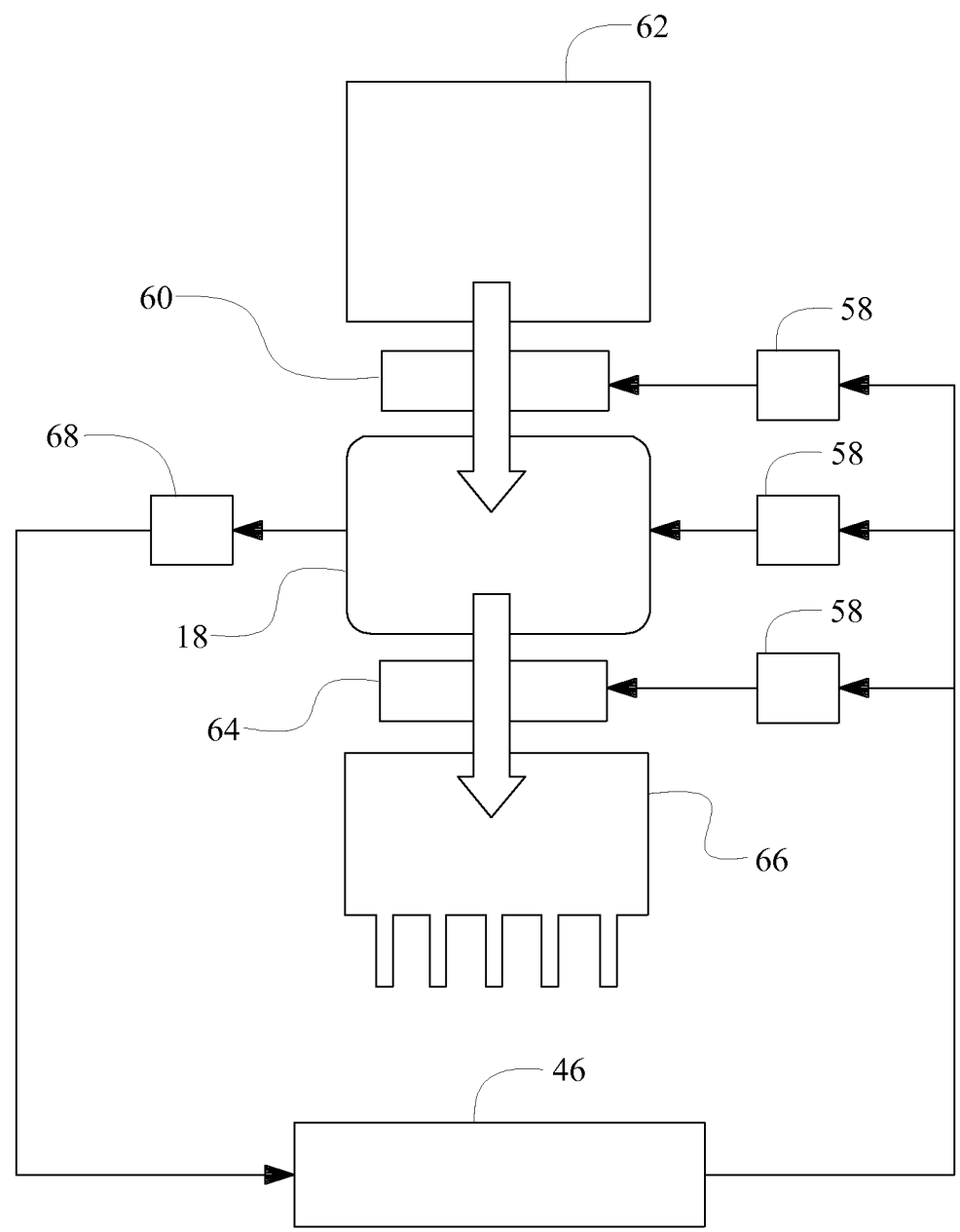
FIG. 3 is a schematic diagram of a control system architecture of a heat sink of the energy harvesting system.

Referring to FIG. 3, the method is shown schematically, and generally includes adjusting heat transfer to or from the shape memory alloy member 18 to ensure that the shape memory alloy member 18 is neither overheated and/or over cooled. As shown in FIG. 3, a first heat transfer medium 60 transfers heat from the heat source 62 to the shape memory alloy member 18 to heat the shape memory alloy member 18. A second heat transfer medium 64 transfers heat from the shape memory alloy member 18 to a heat sink 66 to cool the shape memory alloy member 18. The heat sink 66 is part of the energy harvesting system 42 and may include any device capable of absorbing and dissipating heat from the shape memory alloy member 18. The maximum and minimum temperature of the shape memory alloy member 18, along with a cycle frequency of the expansion and contraction of the shape memory alloy member 18, is obtained, e.g., sensed, and communicated to the electronic control unit 46. The electronic control unit 46 processes the data related to the maximum temperature of the shape memory alloy member 18, the minimum temperature of the shape memory alloy and the cycle frequency of the shape memory alloy, and adjusts the heat transfer rate to the shape memory alloy member 18 through the first heat transfer medium 60, the heat transfer rate from the shape memory alloy member 18 through the second heat transfer medium 64, or the cycle frequency of the shape memory alloy to maintain the operation of the heat engine 16 within a target operating condition. Maintaining the operation of the heat engine 16 within the target operating condition ensures that no excess thermal energy is lost by overheating the shape memory alloy member 18 or by overcooling the shape memory alloy member 18.

More specifically, the method includes, obtaining current operational parameters of the energy harvesting system 42. Preferably, the current operational parameters of the energy harvesting system 42 may be obtained continuously over time. Alternatively, the current operational parameters may be obtained at specified time intervals. The current operational parameters may be obtained inferentially through other various vehicle systems, or may by sensed by one or more of sensors 68.

As described above, the energy harvesting system 42 includes the heat engine 16 having the shape memory alloy member 18, with the shape memory alloy member 18 being cyclically moveable between the martensite phase and the austenite phase. The current operational parameters of the energy harvesting system 42 may include, but are not limited to, a maximum temperature of the shape memory alloy member 18 during a cycle, a minimum temperature of the shape memory alloy member 18 during a cycle or a cycle frequency of the shape memory alloy member 18. The maximum temperature of the shape memory alloy member 18 is used to determine if the shape memory alloy member 18 is overheated. The minimum temperature of the shape memory alloy member 18 is used to determine if the shape memory alloy member 18 is overcooled. The cycle frequency is the time for the shape memory alloy member 18 to cycle back and forth between the martensite phase and the austenite phase one time.

The method may further include defining a target operating condition for the energy harvesting system 42. The target operating condition includes pre-determined values for the various operating parameters of the energy harvesting system 42 designed to maximize efficiency of the heat engine 16 and/or the energy harvesting system 42. The target operating conditions may include but are not limited to the temperature difference between the first fluid region 12 and the second fluid region 14, a temperature of the shape memory alloy member 18, displacement of the shape memory alloy member 18, engagement of the driven component 20, or some other condition effecting the efficiency of the energy harvesting system 42.

In order to ensure optimum efficiency of the energy harvesting system 42, the method may further include engaging the heat engine 16 when the current operational parameters of the energy harvesting system 42 are within the target operating condition of the energy harvesting system 42. Accordingly, the heat engine 16 and/or the energy harvesting system 42 remains disengaged until the current operating parameters of the energy harvesting system 42 are such as to enable efficient operation of the heat engine 16 and the energy harvesting system 42.

The method further includes comparing the obtained current operational parameters to the target operating condition of the energy harvesting system 42. The obtained current operation parameters are compared to the target operating condition to determine if the current operational parameters are within a pre-defined range of the target operating condition of the energy harvesting system 42. The pre-defined range may include any range and is dependent upon many factors including but not limited to, the specific design requirements of the heat engine 16, the design requirements of the driven component 20, the temperature differential between the first fluid region 12 and the second fluid region 14, or some other factor. The pre-defined range may include a percentage above or below a target value. However, it should be appreciated that the pre-defined range may also include a range of zero, wherein the current operating parameters are outside the pre-defined range if the current operating parameters do not equal the target operating conditions. Accordingly, comparing the obtained set of current operational parameters to the target operating condition to determine if the current operational parameters are within a pre-defined range of the target operating condition may further be defined as comparing the obtained set of current operational parameters to a target operating condition to determine if the current operational parameters are equal to the target operating conditions.

The method further includes adjusting the operation of the energy harvesting system 42 when the current operational parameters are outside the pre-defined range of the target operating condition. The operation of the energy harvesting system 42 is continuously adjusted until the obtained current operational parameters are within the pre-defined range or equal to the target operating conditions to maximize an operating efficiency of the energy harvesting system 42.

The method may further include detecting when the shape memory alloy member 18 has transformed from the maratensite phase to the austenite phase, and then acting to immediately stop heating and start cooling the shape memory alloy member 18. Similarly, the method may further include detecting when the shape memory alloy member 18 has transformed from the austenite phase to the martensite phase and then acting to immediately stop cooling and then start heating the shape memory alloy member 18.

Adjusting the operation of the energy harvesting system 42 may include adjusting a heat transfer rate from the heat source 62 to the shape memory alloy member 18, adjusting a heat transfer rate from the shape memory alloy member 18 to the heat sink 66, or adjusting the cycle frequency of the heat engine 16. For example, if the shape memory alloy member 18 is overheated and overcooled during a single cycle, then the electronic control unit 46 may signal to increase the cycle frequency of the shape memory alloy member 18 to increase power output of the energy harvesting system 42. If the shape memory alloy member 18 is overheated but under-cooled, then the electronic control unit 46 may signal to increase the cooling rate, i.e., the heat transfer rate from the shape memory alloy member 18 to the heat sink 66, or alternatively, may signal to decrease the heating rate, i.e., the heat transfer rate from the heat source 62 to the shape memory alloy member 18. If the shape memory alloy member 18 is under-heated but overcooled, then the electronic control unit 46 may signal to increase the heating rate, i.e., the heat transfer rate from the heat source 62 to the shape memory alloy member 18, or alternatively, may signal to decrease the cooling rate, i.e., the heat transfer rate from the shape memory alloy member 18 to the heat sink 66. If the shape memory alloy member 18 is under-heated and under-cooled, then the electronic control unit 46 may signal to increase both the heating rate and the cooling rate, i.e., the heat transfer rate from the heat source 62 to the shape memory alloy member 18 and the heat transfer rate from the shape memory alloy member 18 to the heat sink 66 respectively. If the current operational parameters are within the pre-defined range of the target operating conditions, then the electronic control unit 46 maintains the current operating conditions and does not adjust the energy harvesting system 42.

As noted above, the energy harvesting system 42 includes an electronic control unit 46. The electronic control unit 46 may include a computer having a processor, memory, other hardware components, and software, i.e., algorithms, operable thereon. It should be appreciated that the electronic control unit 46 may include any component necessary to communicate with and control the operation of the heat engine 16, the energy harvesting system 42 and the driven component 20. Accordingly, the method further includes calculating a magnitude of adjustment for adjusting one of a heating rate of the SMA member, a cooling rate of the SMA member and a cycle frequency of heat engine 16. The magnitude of adjustment is dependent upon the difference between the obtained current operating parameters of the energy harvesting system 42 and the target operating condition of the energy harvesting system 42, and is calculated by one or more of the algorithms of the electronic control unit 46. The algorithms may incorporate the difference between the current operating parameters and the target operating conditions. The algorithms may include various control synthesis methods, including but not limited to, PID, LQG, MRAC, nonlinear, or some other control synthesis method not mentioned or described herein.

As noted above, the energy harvesting system 42 includes the driven component 20. In order to maximize efficiency of the energy harvesting system 42, the method may further include disconnecting the driven component 20. The driven component 20 may be disconnected, for example, when the energy harvesting system 42 is unable to provide sufficient energy to operate the driven component 20. For example, the driven component 20 may be disconnected from the heat engine 16 as a result of the temperature differential between the first fluid region 12 and the second fluid region 14 nearing zero, such as when the energy harvesting system 42 is quenched by a deep puddle or a snow bank.

Alternatively, the method may further include adjusting an output of the driven component 20 to match an energy output of the heat engine 16. For example, if the driven component 20 is a generator, the electronic control unit 46 may signal the generator to disconnect one or more coils used to generate current, so that an electrical load of the component/generator 20 is reduced to a level that the energy harvesting system 42 may handle without stalling. Alternatively, the load on the energy harvesting system 42 may be adjusted based upon some other parameter, including but not limited to, an exhaust gas temperature of the vehicle 10, an ambient air temperature, a rotational speed of the heat engine 16, or some other parameter not described herein.

Figure 4:
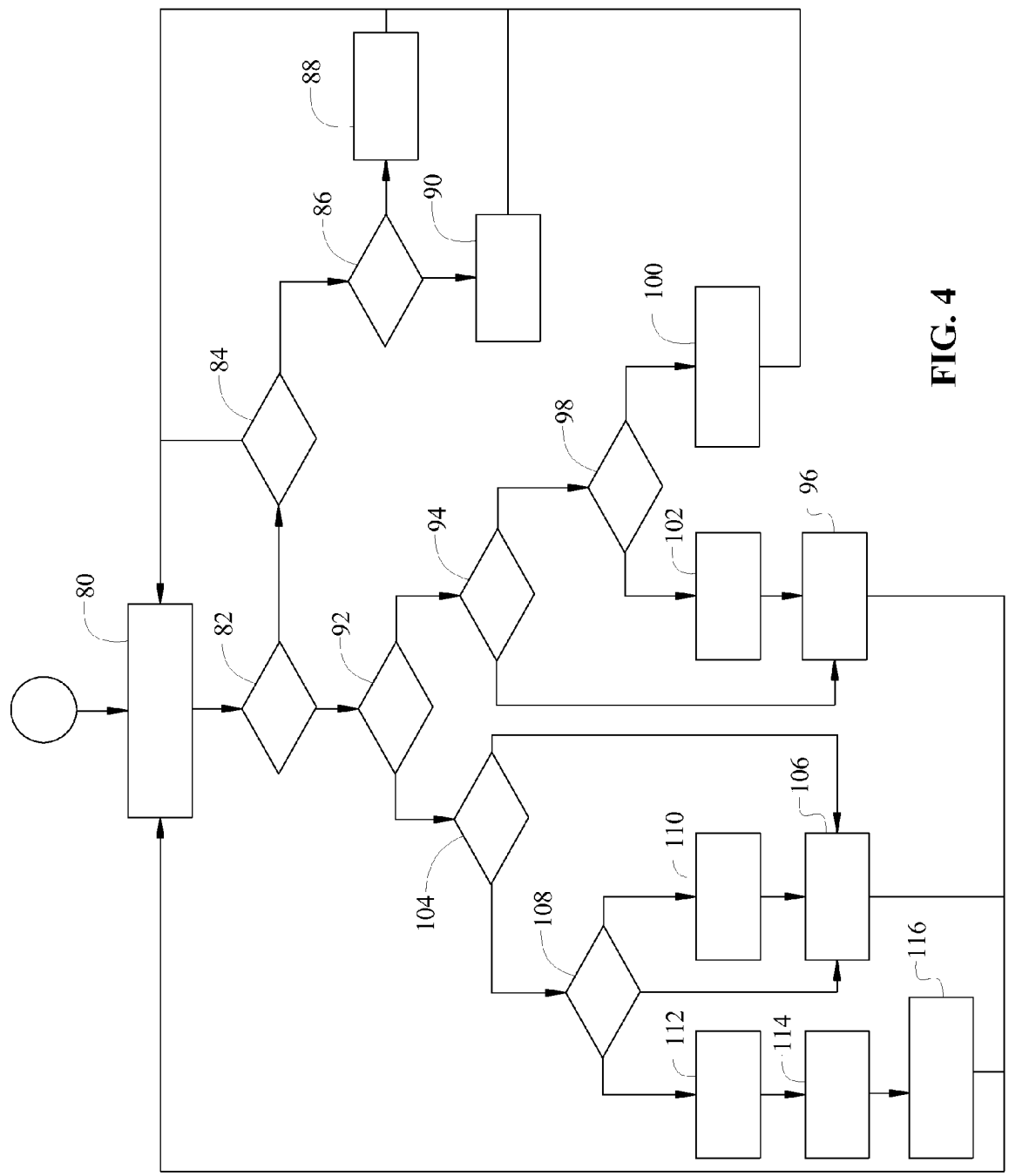
FIG. 4 is a schematic flow chart showing the method of controlling the energy harvesting system.

Referring to FIG. 4, a schematic flow chart showing the method of controlling the energy harvesting system 42 is shown. Throughout FIG. 4, $T_H$ is equal to the maximum heated temperature of the shape memory alloy member 18, $T_C$ is equal to the minimum cooled temperature of the shape memory alloy member 18, $M_f$ is equal to the finish temperature of the martensite phase, and $A_f$ is equal to the finish temperature of the austenite phase.

As shown in FIG. 4, the current operational parameters of the energy harvesting system 42 are obtained in block 80. Block 82 compares the maximum heated temperature of the shape memory alloy member 18 to the finish temperature of the austenite phase.

If the maximum heated temperature of the shape memory alloy member 18 is equal to or within the pre-defined range of the finish temperature of the austenite phase, then the minimum cooled temperature of the shape memory alloy member 18 is compared to the finish temperature of the martensite phase, block 84. If the minimum cooled temperature of the shape memory alloy member 18 is equal to or within the pre-defined range of the finish temperature of the martensite phase, then the electronic control unit 46 takes no action to adjust the energy harvesting system 42. However, if the minimum cooled temperature of the shape memory alloy member 18 is not equal to or within the pre-defined range of the finish temperature of the martensite phase, then the minimum cooled temperature of the shape memory alloy member 18 is compared to the finish temperature of the martensite phase, block 86. If the finish temperature of the martensite phase is greater than the minimum cooled temperature of the shape memory alloy, then the electronic control unit 46 signals to decrease the cooling rate of the shape memory alloy member 18, block 88. Alternatively, if the finish temperature of the martensite phase is not greater than the minimum cooled temperature of the shape memory alloy, then the electronic control unit 46 signals to increase the cooling rate of the shape memory alloy member 18, block 90.

Returning to block 82, if the maximum heated temperature of the shape memory alloy member 18 is not equal to the finish temperature of the austenite phase, then block 92 determines if the maximum heated temperature of the shape memory alloy member is greater than the finish temperature of the austenite phase. If the maximum heated temperature of the shape memory alloy member 18 is greater than the finish temperature of the austenite phase, then the minimum cooled temperature of the shape memory alloy member 18 is compared to the finish temperature of the martensite phase to determine if the minimum cooled temperature of the shape memory alloy member 18 is equal to or within the pre-defined range of the finish temperature of the martensite phase, block 94. If the minimum cooled temperature of the shape memory alloy member 18 is equal to or within the pre-defined range of the finish temperature of the martensite phase, then the electronic control unit 46 signals to decrease the heating rate of the shape memory alloy member 18, block 96. If the minimum cooled temperature of the shape memory alloy member 18 is not equal to or within the pre-defined range of the finish temperature of the martensite phase, then the minimum cooled temperature of the shape memory alloy member 18 is compared to the finish temperature of the martensite phase to determine if the minimum cooled temperature of the shape memory alloy member 18 is less than the finish temperature of the martensite phase, block 98. If the minimum cooled temperature of the shape memory alloy member 18 is less than the finish temperature of the martensite phase, then the electronic control unit 46 signals to increase the cycle frequency of the shape memory alloy member 18, block 100. However, if the minimum cooled temperature of the shape memory alloy member 18 is not less than the finish temperature of the martensite phase, then the electronic control unit 46 signals to increase the cooling rate of the shape memory alloy member 18, block 102 and/or decrease the heating rate of the shape memory alloy member 18, block 96.

Returning to block 92, if the finish temperature of the austenite phase is not less than the maximum heated temperature of the shape memory alloy member 18, then the minimum cooled temperature of the shape memory alloy member 18 is compared to the finish temperature of the martensite phase to determine if the minimum cooled temperature of the shape memory alloy member 18 is equal to or within the pre-defined range of the finish temperature of the martensite phase, block 104. If the minimum cooled temperature of the shape memory alloy member 18 is equal to or within the pre-defined range of the finish temperature of the martensite phase, then the electronic control unit 46 signals to increase the heating rate to the shape memory alloy member 18, block 106. If the minimum cooled temperature of the shape memory alloy member 18 is not equal to or within the pre-defined range of the finish temperature of the martensite phase, then the minimum cooled temperature of the shape memory alloy member 18 is compared to the finish temperature of the martensite phase to determine if the minimum cooled temperature of the shape memory alloy member 18 is less than the finish temperature of the martensite phase, block 108. If the minimum cooled temperature of the shape memory alloy member 18 is less than the finish temperature of the martensite phase, then the electronic control unit 46 may signal to decrease the cooling rate of the shape memory alloy member 18, block 110, and/or increase the heating rate of the shape memory alloy member 18, block 106. If the minimum cooled temperature of the shape memory alloy member 18 is not less than the finish temperature of the martensite phase, then the electronic control unit 46 may signal to increase the heating rate of the shape memory alloy member 18, block 112, increase the cooling rate of the shape memory alloy member 18, block 114, and/or decrease the cycle frequency of the shape memory alloy member 18, block 116.

While the best modes for carrying out the invention have been described in detail, those familiar with the art to which this invention relates will recognize various alternative designs and embodiments for practicing the invention within the scope of the appended claims.

The invention claimed is:

1. A method of controlling an energy harvesting system that converts radiant heat from a heat source into mechanical energy, wherein the energy harvesting system includes a heat engine having a Shape Memory Alloy (SMA) member cyclically moveable between an austenite phase and a martensite phase in response to a temperature difference between a first fluid region and a second fluid region, the method comprising:

obtaining current operational parameters of the energy harvesting system, including, a cycle frequency, a maximum temperature of the SMA member during a cycle, and a minimum temperature of the SMA member during a cycle;

comparing the obtained current operational parameters to a target operating condition of the energy harvesting system, including a finish temperature of the martensite phase, and a finish temperature of the austenite phase, to determine if the current operational parameters are within a pre-defined range of the target operating condition of the energy harvesting system;

calculating a magnitude of adjustment for a heating rate of the SMA member, a magnitude of adjustment for a cooling rate of the of the SMA member, or a magnitude of adjustment for the cycle frequency of the SMA member, based on a numerical difference between the obtained current operating parameters of the energy harvesting system and the target operating condition of the energy harvesting system;

adjusting at least one of the heating rate of the SMA member at the calculated magnitude of adjustment for the heating rate, the cooling rate of the SMA member at the calculated magnitude of adjustment for the cooling rate of the SMA member, or the cycle frequency of the SMA member at the calculated magnitude of adjustment for the cycle frequency of the SMA member when the current operational parameters are outside the pre-defined range of the target operating condition until the obtained current operational parameters are within the pre-defined range of the target operating conditions to maximize an operating efficiency of the energy harvesting system;

wherein the cycle frequency is adjusted at the calculated magnitude of adjustment for the cycle frequency, when the SMA member is overheated and overcooled with the maximum temperature of the SMA member during a cycle being greater than the finish temperature of the austenite phase, and with the minimum temperature of the SMA member during a cycle being less than the finish temperature of the martensite phase;

wherein the cooling rate is increased at the calculated magnitude of adjustment for the cooling rate, or the heating rate is decreased at the calculated magnitude of adjustment for the heating rate, when the SMA member is overheated and undercooled with the maximum temperature of the SMA member during a cycle being greater than the finish temperature of the austenite phase, and with the minimum temperature of the SMA member during a cycle being greater than the finish temperature of the martensite phase; and wherein the heating rate is increased at the calculated magnitude of adjustment for the heating rate, or the cooling rate is decreased at the calculated magnitude of adjustment for the cooling rate, when the SMA member is underheated and overcooled with the maximum temperature of the SMA member during a cycle being less than the finish temperature of the austenite phase, and with the minimum temperature of the SMA member during a cycle being less than the finish temperature of the martensite phase.

2. A method as set forth in claim 1 wherein adjusting at least one of the heating rate of the SMA member at the calculated magnitude of adjustment for the heating rate, the cooling rate of the SMA member at the calculated magnitude of adjustment for the cooling rate of the SMA member, or the cycle frequency of the SMA member at the calculated magnitude of adjustment for the cycle frequency of the SMA member includes adjusting a heat transfer rate from one of the first fluid region or the second fluid region to the SMA member.

3. A method as set forth in claim 1 wherein adjusting at least one of the heating rate of the SMA member at the calculated magnitude of adjustment for the heating rate, the cooling rate of the SMA member at the calculated magnitude of adjustment for the cooling rate of the SMA member, or the cycle frequency of the SMA member at the calculated magnitude of adjustment for the cycle frequency of the SMA member includes adjusting a heat transfer rate from the SMA member to a heat sink.

4. A method as set forth in claim 1 wherein the energy harvesting system includes a driven component and the method further comprises disconnecting the driven component.

5. A method as set forth in claim 1 wherein the energy harvesting system includes a driven component and the method further comprises adjusting an output of the driven component to match an energy output of the heat engine.

6. A method as set forth in claim 1 further comprising engaging the heat engine when the current operational parameters of the energy harvesting system are within the target operating condition of the energy harvesting system.

7. A method as set forth in claim 1 wherein obtaining the current operational parameters is further defined as inferring a set of current operational parameters.

8. A method as set forth in claim 1 wherein the energy harvesting system includes at least one temperature sensor, and wherein obtaining the current operational parameters is further defined as sensing the current operational parameters with the at least one temperature sensor to obtain a maximum temperature of the SMA member and a minimum temperature of the SMA member during a cycle.

9. A method as set forth in claim 1 further comprising defining the target operating condition for the energy harvesting system.

10. A method as set forth in claim 1 wherein obtaining the current operational parameters is further defined as continuously obtaining a set of current operational parameters.

11. A method as set forth in claim 1 wherein comparing the obtained current operational parameters to a target operating condition of the energy harvesting system to determine if the current operational parameters are within a pre-defined range of the target operating condition of the energy harvesting system is further defined as comparing the obtained current operational parameters to a target operating condition of the energy harvesting system to determine if the current operational parameters are equal to the target operating condition of the energy harvesting system.

12. A method as set forth in claim 1 wherein obtaining the current operational parameters includes detecting a transformation of the shape memory alloy member between a martensite phase and an austenite phase.

13. A method as set forth in claim 12 further comprising acting to stop transferring radiant heat to the shape memory alloy member and start transferring heat from the shape memory alloy member when the shape memory alloy member has transformed from the martensite phase to the austenite phase.

14. A method as set forth in claim 1 further comprising acting to stop transferring heat from the shape memory alloy member and start transferring radiant heat to the shape memory alloy member when the shape memory alloy member has transformed from the austenite phase to the martensite phase.

* * * * *